July 3, 1956 S. I. MACDUFF 2,752,895
HYDRAULIC MOTOR AND CONTROL THEREFOR
Filed March 9, 1951
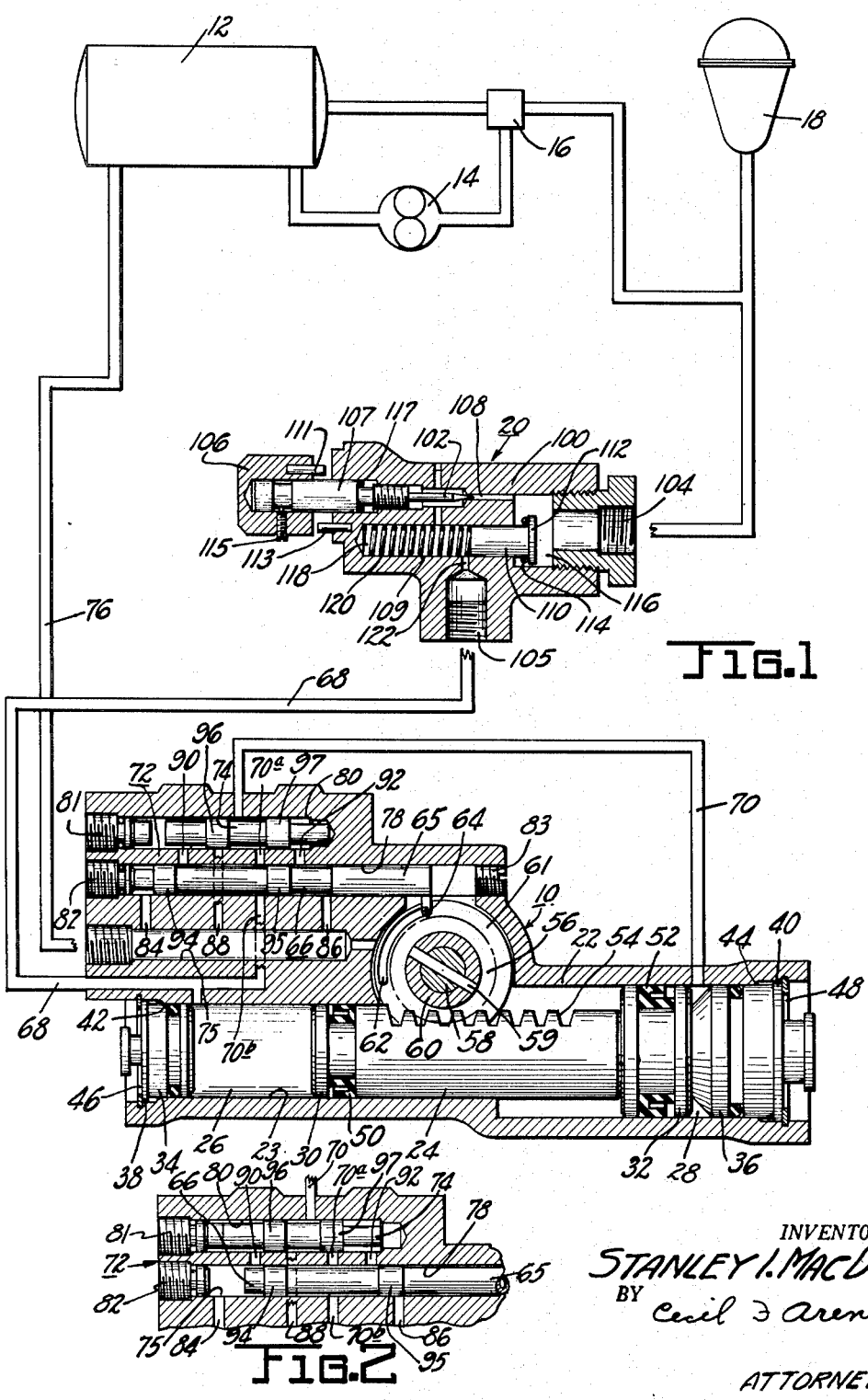
INVENTOR.
STANLEY I. MACDUFF
BY Cecil J. Arens
ATTORNEY

United States Patent Office 2,752,895
Patented July 3, 1956

2,752,895
HYDRAULIC MOTOR AND CONTROL THEREFOR

Stanley I. MacDuff, South Bend, Ind., assignor to Bendix Aviation Corporation, South Bend, Ind., a corporation of Delaware Application March 9, 1951, Serial No. 214,670

4 Claims. (Cl. 121—157)

This invention concerns motors of the fluid actuated type and controls for the same.

It is an object of the invention to provide a fluid actuated windshield wiper motor capable of a substantially constant speed.

Another object of the invention resides in the provision of a fluid actuated windshield wiper motor simple in construction and compact in form.

An important object of the invention resides in the provision of a fluid actuated motor automatically controlled by a fluid pressure responsive valve mechanism.

A very important object of the invention resides in the provision of a hydraulic system having a fluid motor and a control therefor, the latter of which maintains the speed of the motor constant notwithstanding changing load conditions.

Still other objects and advantages of this invention will be apparent from a consideration of the following detailed description, taken in connection with the accompanying drawing, which is for purposes of illustration only, and not intended to define the scope of the invention.

Figure 1 shows the device of the invention incorporated into a hydraulic system for operating a windshield wiper blade; and Figure 2 illustrates another position of the valve means.

Referring to Figure 1 of the drawing, the reference numeral 10 designates the fluid motor mechanism of the invention connected in a hydraulic system comprising a reservoir 12, a pump 14, an unloading valve 16, an accumulator 18, and a speed control valve 20, the latter of which is interposed between the pressure source and the fluid motor mechanism for controlling the fluid pressure to the latter in accordance with the load thereon, for maintaining said mechanism at a predetermined speed. This valve 20 also functions as a start and stop valve, that is, when closed the fluid motor mechanism is rendered inoperative.

It is a function of the unloading valve 16 to permit the fluid from the pump to be returned to the reservoir 12 when the accumulator pressure has reached a predetermined high value and to direct the fluid from the pump to the accumulator when it has reached a predetermined lower value.

The fluid motor mechanism 10 comprises a housing 22 having a bore 23 therein, in which a fluid actuable member or piston 24 is arranged for movement in alternate directions and forming therewith a pair of opposed chambers 26 and 28. The fluid driven member 24 is provided with ends 30 and 32, having different effective areas, forming movable walls with chambers 26 and 28 respectively. In order to permit wider tolerances in the concentricities between the ends of bore 23, the end 32 is separate from the end 30. The ends of the bore 23 are closed by plugs 34 and 36. The plugs 34 and 36 are formed with enlarged annular ribs 38 and 40 which abut shoulders 42 and 44. The plugs 34 and 36 are retained in the ends of the bore by snap rings 46 and 48 located in grooves. Each of the plugs 34 and 36 is equipped with a seal to prevent leakage to atmosphere. The ends 30 and 32 of the driven member are likewise equipped with packing glands or seals 50 and 52 to preclude leakage from the chambers 26 and 28 respectively. A gear rack 54 is integrally formed with the driven member for meshing relationship with a gear sector 56 mounted on a shaft 58 rotatably carried in the housing 22. A pin 59 passes through the shaft and gear sector to securely fix the two parts against relative rotation. A windshield wiper blade (not shown) is fixed to one end of the shaft 58. A plate 61, suitably fixed to the shaft 58 adjacent the gear sector, is slotted at 62, to receive a pin 64, carried by an extension 65, of valve member 66. The length of the slot 62 is determined by the amount of axial movement of the driven member, so that at each end of its stroke, the valve member 66 will be shifted for a purpose to be hereinafter described.

Chamber 26 is connected to the fluid pressure source 18 via conduit 68 and the control valve 20. Chamber 28 is connected to the fluid pressure source 18 via passages 70, 70a, 70b, the conduit 68, and the control valve 20. A bore 75, in the housing, communicates with the reservoir 12 through pipe line 76.

The valve member 66 and the fluid pressure actuated valve member 74, which comprise valve means 72, are arranged in bores 78 and 80 respectively for controlling the release and admission of fluid under pressure to chamber 28. A plug 81 closes one end of the bore 80; plugs 82 and 83 close the ends of the bore 78. Passages 84 and 86 connect the bore 75, which communicates with the reservoir, to the bore 78 at spaced intervals. A passage 88, has one end terminating in the bore 80, intermediate its ends, and the other end of the passage is connected to the bore 75. The passage or conduit 70 communicates the chamber 28 with the pipe line 68, via the bores 78 and 80. Passages 90 and 92 provide intercommunication between the bores 78 and 80 at axially spaced intervals along the bores.

The valve member 66, which in combination with the hydraulically actuated valve member 74 comprises the aforesaid valve means 72, is formed with lands 94 and 95. With the valve member 66 in the position shown in Figure 1 fluid is directed to the left end of bore 80 where the fluid acts on valve member 74, via the passages 70b and 90. The fluid under pressure admitted to the left end of the bore 80 urges the valve member 74 to the right, as shown in Figure 1. The valve member 74 is equipped with lands 96 and 97 so spaced apart that when the valve member is positioned as aforementioned the passage 88 is covered by the land 96 and the passage 70a is uncovered for communication with the passage 70, for communicating chamber 28 with the fluid pressure source.

Movement of the driven member 24 to the left end of the housing rotates the gear sector 56 clockwise, thus causing the valve member 66 to be carried to the right, through the interaction of the slot 62 and pin 64. See Figure 2. At this time land 94 covers passage 90 and land 95 is moved to the right of passage 92, thus admitting fluid pressure to the right end of the bore 80 causing the member 74 to be moved to the left against the stop or plug 81. This action of the valve member 74 moves the land 97 over the passage 70a, and moves the land 96 to the left of the passage 88, thereby communicating the chamber 28 to the reservoir 12.

The manually settable speed control valve 20 is responsive to pressure drop across a variable orifice for maintaining the driven member at a substantially constant speed irrespective of varying load conditions thereon, and varying pressure within the hydraulic system. The speed control valve is essentially flow responsive. The speed control valve comprises a body member 100, and a manually settable needle valve 102 interposed between inlet and outlet ports 104 and 105 respectively. A knob 106 carried on valve stem 107 permits adjustment of the needle valve 102 for controlling flow through passage 108. This needle valve provides a variable orifice the drop across which is held fixed for a given setting by means hereinafter described. This insures a constant flow past the needle valve. Pins 111 and 113, carried by the knob 106 and body 100 respectively permit adjustment of the needle valve from closed to wide open position without damaging the valve seat or turning the valve stem out of the body. A set screw 115, threadedly engages the knob 106, and has an end in frictional engagement with the valve stem 107 to provide for axial adjustment of the knob, which is sometimes required when setting the needle valve 102. For example, if the pin 111 should strike the end of the body 100 before the needle valve was seated the set screw 115 would be loosened and the knob shifted to the left, thus permitting further rotation of the valve stem. A sealing ring 117 encircles the valve stem 107 to prevent leakage. The body member 100 is bored at 109 to receive a valve element 110, furnished with a flanged end 112. A sealing ring 114 is carried on the end of the element adjacent the flange for sealing inlet chamber 116 from chamber 118 when the needle valve 102 is closed. A spring 120 is so positioned in the chamber 118 as to normally urge the valve element 110 to the right to thereby uncover passage 122. For any predetermined speed setting of the needle valve 102, the left end of valve element 110 bears a definite relationship with respect to the passage 122, and any variation in speed of the driven member, due to changing load conditions, will alter this relationship in order to hold the speed of the driven member constant. When such a speed setting is made, the flow past the needle valve establishes opposing pressures, acting on the ends of valve element 110, thus positioning the same over the passage 122 so as to provide the flow required. If, however, the load on the wiper arm should increase from its normal loading, thus tending to slow down the driven member 24, the flow past the needle valve would tend to decrease because of the change in pressure drop across this valve. Therefore, in order to keep the flow constant, the element 110 is moved downwardly to thereby uncover passage 122, hence tending to increase the flow to offset the increase in load. If the load on the wiper arm should decrease from its normal loading, the pressure drop across the needle valve will increase, thus tending to increase the flow. However, such an increase is forestalled by the valve element 110, which moves over the passage 122, hence restricting flow to offset the reduced load.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a fluid pressure system the combination of a fluid motor mechanism having a housing, a fluid actuable driven member in the housing forming therewith a pair of opposed chambers, said driven member being provided with ends of unequal effective areas forming movable walls in the respective chambers, means for connecting said chambers to fluid under pressure, valve means in the housing comprising two cooperating slide valve members, one of said valve members being operatively connected to said driven member for periodically controlling the fluid pressure to the chamber having the movable wall with the greater effective area via said other valve member, and flow responsive valve means in said first named means for maintaining said driven member at a substantially constant speed notwithstanding varying pressures due to load conditions on the latter, said last named means comprising a body member having inlet and outlet ports therein, a passage connecting the ports, a first valve capable of adjustment to different flow settings for controlling flow through said passage, said first valve having a closed position, and a second valve capable of holding the flow for a given setting substantially constant through said passage.

2. In a fluid pressure system the combination of a fluid motor mechanism having a housing, a fluid actuable driven member in the housing forming therewith a pair of opposed chambers, said driven member being provided with ends of unequal effective areas forming movable walls in the respective chambers, means for connecting said chambers to fluid under pressure, valve means, comprising two cooperating slide valve members, one of which is operatively connected to said driven member for periodically controlling the release and admission of fluid to the chamber having the movable wall with the greater effective area via said other valve member, and manually settable speed control valve means in said first named means, responsive to fluid flow and independent of pressure in said chamber, for maintaining the driven member at a constant speed notwithstanding varying load conditions on the latter.

3. In a fluid pressure system the combination of a fluid motor mechanism having a housing, a fluid actuable driven member reciprocably located in the housing and forming therewith a pair of opposed chambers, said driven member being provided with ends of unequal effective areas forming movable walls in the respective chambers, means for connecting said chambers to a fluid pressure source, said last named means including a speed control valve mechanism having an inlet port, an outlet port, and means arranged to be subjected to the hydraulic pressures existing across said valve mechanism thereby maintaining the flow past said outlet port substantially uniform and valve means within said housing comprising two cooperating slide valve members, said valve means being operatively connected to said driven member for actuation thereby toward each end of its stroke for controlling the admission and release of fluid to the chamber having the movable wall with the greater effective area.

4. In a fluid pressure system for a windshield wiper, the combination of a fluid motor mechanism having a housing, a piston in the housing for movement in alternate directions and forming therewith a pair of opposed chambers, said piston being provided with ends of unequal effective areas forming movable walls in the respective chambers, a gear rack formed on said piston, a gear sector pivotally carried in the housing in meshing relationship with said rack, means for connecting said chambers to fluid under pressure, said last named means including valve means for maintaining constant flow to said fluid motor mechanism, said valve means comprising a body member having inlet and outlet ports therein, a passage connecting the ports, a first valve controlling the passage and capable of adjustment to different flow requirements and having a closed position, a second valve controlling the passage downstream from the first valve and including an element slidably positioned in the body so that its ends are subjected to the pressure drop across said first valve, one end of said element being formed to control the opening of said passage and the other end being formed to receive a seal to prevent leakage between the inlet and outlet along said element between the latter and the body member when said first valve is in a closed position, and second valve means for controlling flow to the chamber having the movable wall with the larger effective area, said second valve means including a first valve member slidably positioned in the housing and connected to said gear sector for actuation thereby as the piston approaches the end of its stroke in either direction, and a second valve member slidably positioned in the housing and hydraulically controlled by said first valve member for alternately communicating the chamber with the larger movable wall to fluid pressure or exhaust.

References Cited in the file of this patent
UNITED STATES PATENTS

| Number | Name | Date |
|---|---|---|
| 825,950 | Weir | July 17, 1906 |
| 1,467,522 | Amsler | Sept. 11, 1923 |
| 1,938,021 | Hobson | Dec. 5, 1933 |
| 2,201,248 | Stone | May 21, 1940 |
| 2,272,684 | Vickers | Feb. 10, 1942 |
| 2,310,750 | Schnell | Feb. 9, 1943 |
| 2,314,005 | Martin | Mar. 16, 1943 |
| 2,432,305 | Geiger | Dec. 9, 1947 |
| 2,462,983 | MacDuff et al. | Mar. 1, 1949 |
| 2,549,979 | Lane | Apr. 24, 1951 |